(12) United States Patent
Eid et al.

(10) Patent No.: US 9,008,422 B2
(45) Date of Patent: Apr. 14, 2015

(54) METHODS OF CONTENT-DRIVEN IMAGE CROPPING

(71) Applicant: Lexmark International, Inc., Lexington, KY (US)

(72) Inventors: Ahmed Hamad Mohamed Eid, Lexington, KY (US); Tomasz Jan Cholewo, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 208 days.

(21) Appl. No.: 13/721,778

(22) Filed: Dec. 20, 2012

(65) Prior Publication Data

US 2014/0003718 A1    Jan. 2, 2014

Related U.S. Application Data

(60) Provisional application No. 61/665,798, filed on Jun. 28, 2012.

(51) Int. Cl.
*G06K 9/00* (2006.01)
*G06T 11/60* (2006.01)

(52) U.S. Cl.
CPC ..................................... *G06T 11/60* (2013.01)

(58) Field of Classification Search
CPC .......... G06K 9/00369; G06K 9/00463; G06K 9/4647; G06K 9/6835; G06K 9/685; G06K 9/6857; G06T 7/20; G06T 7/2053; G06T 7/401; G06T 11/60; G06T 2207/10016; G06T 2207/20008; G06T 2207/20144; G06T 2207/30196; H04N 5/272
See application file for complete search history.

(56) References Cited

U.S. PATENT DOCUMENTS

| | | | |
|---|---|---|---|
| 6,240,197 B1 * | 5/2001 | Christian et al. | 382/103 |
| 7,609,885 B2 * | 10/2009 | Hovden | 382/169 |
| 8,023,755 B2 * | 9/2011 | Wagner | 382/243 |

\* cited by examiner

*Primary Examiner* — Jose Couso

(57) ABSTRACT

A method of cropping an image based on a content of the image according to one example embodiment includes identifying image features in the content of the image, determining horizontal histogram frequencies and vertical histogram frequencies of the identified image features, determining borders of a document bounding box based on the determined horizontal histogram frequencies and vertical histogram frequencies, and cropping the image according to the document bounding box.

19 Claims, 3 Drawing Sheets

METHODS OF CONTENT-DRIVEN IMAGE CROPPING

CROSS REFERENCES TO RELATED APPLICATIONS

This application claims priority to U.S. Provisional Patent Application Ser. No. 61/665,798, filed Jun. 28, 2012, entitled "Methods of Content Driven Image Cropping," the content of which is hereby incorporated by reference in its entirety.

BACKGROUND

1. Field of the Disclosure

The present disclosure relates generally to image cropping and more particularly to content-driven image cropping methods.

2. Description of the Related Art

Document detection is a common feature in mobile image capture software. This feature facilitates effective document cropping for further image processing of relatively small cropped images. Manipulating cropped documents helps in speeding up image processing as well as promotes more effective use of different image processing techniques. Cropped documents also provide small file sizes that are preferable for document sharing.

Existing document detection and image cropping techniques may detect documents in images captured from mobile devices. These methods detect documents by finding document borders or corners. However, in cases when there is not enough contrast between the captured document and the background, which may occur in mobile-captured images taken in an uncontrolled environment (e.g. non-uniform lighting, variable set-ups, etc.), these techniques may fail to detect document borders and corners. In images that are either of low quality or were taken in an uncontrolled environment with uncontrolled conditions, document borders may become indistinguishable from the background, thereby making document detection difficult or ineffective.

Thus, there is a need for a method of detecting and cropping mobile-captured documents that determines a bounding box for cropping a captured document in an image based on salient features being extracted from document contents. There is a need for a method that does not rely solely on finding highly structured features such as text or straight lines but also on other significant image features that documents in a captured image may have. Furthermore, there is a need for a method that detects captured documents with undistinguished borders.

SUMMARY

A system capable of and methods for cropping one or more documents from an image based on content of the image are disclosed. The method of cropping an image based on image content and using a document bounding box may include identifying image features of the image by determining a gradient of the image, determining horizontal and vertical histogram frequencies of the image features, identifying borders of the document bounding box for cropping the image, and cropping the image using the document bounding box.

In one aspect of the example embodiment, the method may include downscaling the image prior to the cropping the image. In another aspect, identifying the borders of the document bounding box may include examining the horizontal and vertical histogram frequencies of the image features. In yet another aspect, examining the horizontal histogram frequencies of the image features may include determining a left and a right border of the document bounding box, wherein the left and the right borders are at least a minimum distance from the corresponding left and right edges of the image, respectively.

In one aspect of the example embodiment, the identified borders of the document bounding box may contain image features that reach a predetermined feature count. In yet another aspect of the example embodiment, identifying the borders of the document bounding box may include determining horizontal and vertical centroids from image features of the horizontal and vertical histograms, respectively. In another aspect, the method may also include determining a horizontal and a vertical measure of dispersion of image features in the horizontal and vertical histograms, respectively. In yet another aspect of the example embodiment, identifying the borders of the document bounding box may include searching the horizontal histogram frequencies for image features until an absolute value of a horizontal center of the detected document bounding box minus the determined horizontal centroid is less than or equal to the product of a predefined parameter and the horizontal measure of dispersion. In another aspect, identifying the borders of the document bounding box may include searching the vertical histogram frequencies for image features until an absolute value of a vertical center of the detected document bounding box minus the determined vertical centroid is less than or equal to the product of a predefined parameter and the vertical measure of dispersion.

In yet another aspect of the example embodiment, the method may include applying image processing techniques to the cropped image. In another aspect, the document bounding box may be a border of the cropped image or an initial bounding box for corner detection techniques to help limit the search area for document corners.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION

Figure 1:
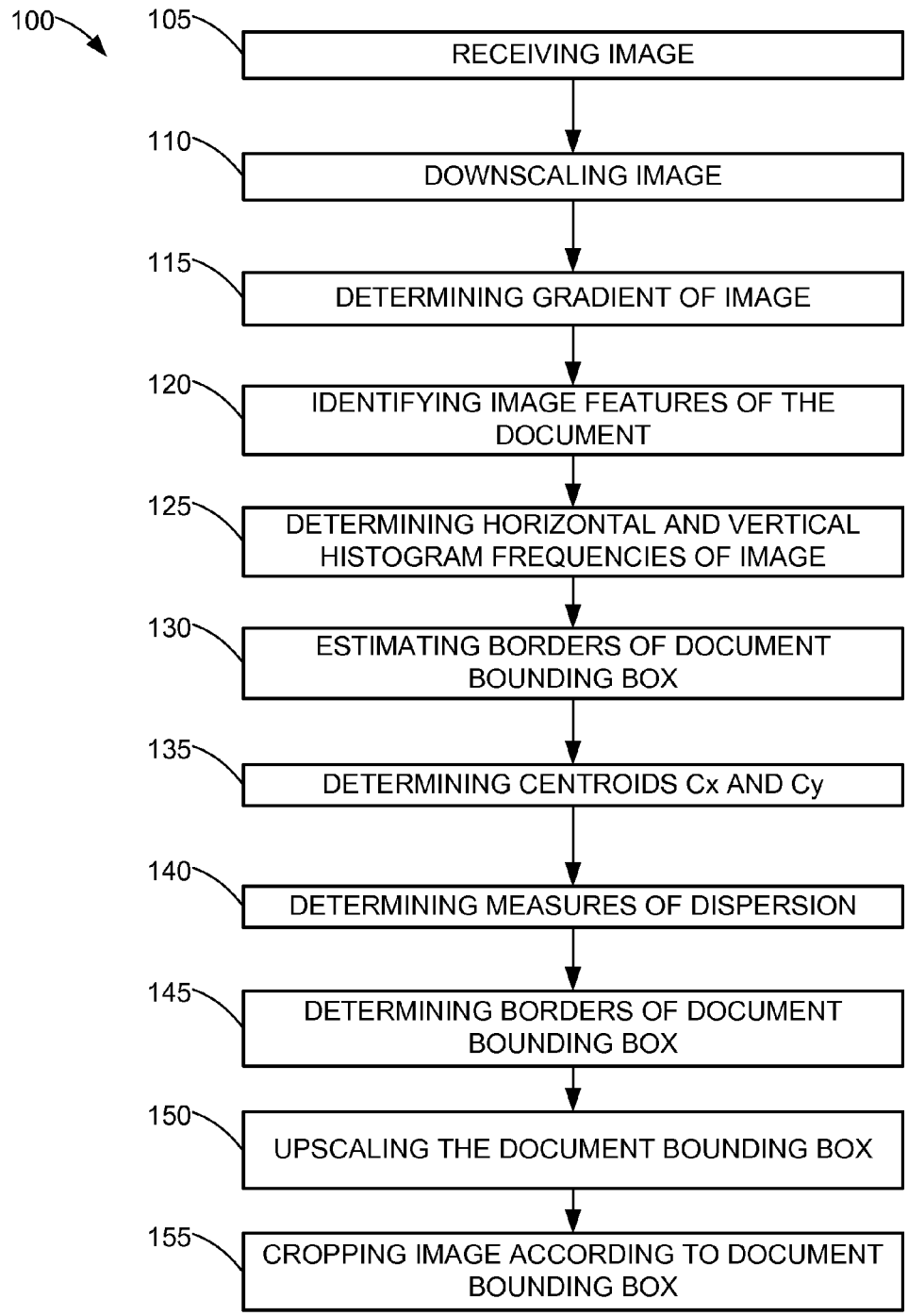
FIG. 1 is a flowchart depicting one example embodiment of a method for content-driven image cropping.

It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

In addition, it should be understood that embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the descriptions below.

These computer program instructions may also be stored in a non-transitory computer-readable medium that may direct a computer or other programmable data processing apparatus to function in a particular manner, such that the instructions stored in the computer-readable medium may produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions, such as the process models and the combined process models, as will be described in greater detail below, may be displayed in a user interface or computer display of the computer or programmable apparatus that implement the functions or the computer program instructions.

Disclosed are a system and methods for cropping a document from an image using a document bounding box that includes determining the gradient of the image and identifying image features of the document, determining horizontal and vertical histogram frequencies of the identified image features, identifying borders of the document bounding box by examining the image features in the horizontal and vertical histogram frequencies, finding vertical and horizontal centroids and horizontal and vertical measures of dispersion, resizing the document bounding box if necessary, and cropping the document in the image using the document bounding box.

The document in the image may refer to one or more significant features in the image which may be distinguished from the background or from other relatively insignificant image elements in the image. For example, a user may capture an image of a receipt and the captured image may include other image elements that may not be a part of the receipt such as, for example, a background or another object that was captured in the same image as the receipt. The methods disclosed may crop the image such that areas of the image that contain the document (e.g. the text/images making up the receipt) is retained while leaving out other relatively insignificant image features from the cropped image.

The methods disclosed may be computer program instructions executed by a processor of a computing device such as, for example, a mobile device. The mobile device may also be any form of computing device that may execute a function such as, but not limited to, a personal computer, an image-capturing device such as a digital camera or a document scanner, a tablet computer, a smartphone, an image-forming device such as a printer or any other device that includes a processor and a computer-readable medium, such as a random access memory (RAM), coupled to the processor. The processor may execute computer-executable program instructions stored in the memory.

FIG. 1 is a flowchart depicting a method 100 according to one example embodiment for content-driven image cropping. The method of cropping the image may include receiving the image, downscaling the image, determining the gradient of the image and identifying image features of the document, determining horizontal and vertical histogram frequencies of the identified image features per column and row of pixels in the image, identifying borders of a document bounding box and cropping a portion of the image using the document bounding box.

At block 105, an image may be received for processing. Receiving an image may include receiving an image captured by a mobile device. The mobile device may capture an image using a camera installed within the mobile device or connected to the mobile device by means of a communications interface.

In another alternative example embodiment, the image may be received by another application running in the mobile device. Receiving the image for processing may include receiving an image that has been uploaded to or downloaded by the mobile device from another application in the mobile device. In another alternative example embodiment, the image may be uploaded to or downloaded by the mobile device from another device connected to the mobile device.

The image received for processing may be obtained from a number of sources such as, for example, images scanned by a scanner, stored on fixed or portable computer-readable storage media, optical drives, storage devices accessed from media attached to a communication port of a mobile device, or accessed from a network (e.g., a LAN, WAN or the Internet).

In an example embodiment, processing the image may include determining a document in the image and cropping the document using a document bounding box, thereby removing sections of the image that are identified as not part of the document in the image.

At block 110, the received image may be downscaled by a desired scaling factor. Downscaling the received image may be a transformation operation applied to the image that reduces the image in at least one of its size or scale by the specified scaling factor.

As will be appreciated by those of ordinary skill in the art, scaling an image may include the creation of output pixels that are related to the immediate surrounding pixels from a target area in an input image. In particular, a geometric transformation may be used to compute the coordinates of output pixels from input pixels. The value of each output pixel may be established via one or more calculations, such as a weighted calculation, interpolation, or another method known in the art. When performing a downscale, or a reduction, fewer pixels may be created in the output image compared to the pixels in the input image.

In an alternative example embodiment, downscaling of the image may be optional. Image downscaling prior to processing of the image may be performed to make image processing faster or to remove noise in the image. Other purposes for downscaling an image prior to processing, other than those aforementioned, will be known by those of ordinary skill in the art.

The scaling factor by which the received image is downscaled may be predefined. In alternative example embodiments, the scaling factor may be customizable by a user. In another alternative example embodiment, the scaling factor may be dependent on the device used to receive and process the received image.

At block 115, the gradient G(x,y) of the input image, which may be optionally scaled, may be determined G(x,y) may return a numerical gradient of each pixel of the image.

Determining the gradient G(x,y) of the input image may include determining the image intensity values at each image point using the derivatives in the horizontal and vertical directions indicated by the horizontal and vertical gradient of the pixels in the input image as indicated by x and y, respectively. The horizontal gradient may be a one-dimensional derivative in the x direction, while the vertical gradient may be a one-dimensional derivative in they direction.

At block 120, the gradient G(x,y) may be used to identify image features of the document according to the following formula:

$$|G(x,y)|>G_{th},$$

where $G_{th}$ is a predefined threshold.

Image features may be distinctive or salient features in the received image, which may be portions in the image containing one or more documents. Salient features may be elements or regions in the image having a high contrast such as, for example, edges, text, blobs, corners, and other textual or non-textual features in the image which may indicate a document to cropped. In the example embodiment, salient features may be one or more pixels in the image wherein the absolute value of the magnitude of the gradient of the pixel is greater than the specified gradient threshold $G_{th}$.

$G_{th}$ is a predefined gradient threshold used to identify image features using the determined gradient. The gradient threshold may be used to evaluate whether a pixel in the image contains a salient image feature or not. If the magnitude of the gradient of a pixel in a pixel row or a pixel column of the image is less than the gradient threshold $G_{th}$, the pixel is determined to not contain a salient image feature. On the other hand, if the magnitude of the gradient of a pixel in a pixel row or a pixel column of the image is greater than the gradient threshold $G_{th}$, the pixel is identified to contain a salient image feature.

At block 125, identifying the document to be cropped may include determining horizontal, $h_x$, and vertical, $h_y$, histogram frequencies of the image features identified at block 120. The horizontal, $h_x$, and vertical, $h_y$, histogram frequencies of the identified image features are determined per column and row of pixels in the image, respectively.

For determining the horizontal histogram frequencies, $h_y$, a number of pixels that are above the gradient threshold are counted for every column of pixels of the image. Using the horizontal histogram frequencies, $h_x$, corresponding to the image, the entire distribution of pixels having salient image features, or pixels that are above the gradient threshold in the pixel columns of the image, may be evaluated.

Similarly, the vertical histogram frequencies, $h_y$, are determined by counting a number of pixels above the gradient threshold $G_{th}$ for every row of pixels of the image. Using the vertical histogram frequencies, $h_y$, corresponding to the image, the entire distribution of pixels having salient image features, or pixels that are above the gradient threshold $G_{th}$ in the pixel rows of the image, may be evaluated.

As desired, the horizontal and vertical histogram frequencies $h_x$ and $h_y$ may be plotted in a graphical histogram that displays a visual impression of the distribution of pixels that are above the gradient threshold $G_{th}$ for all the columns and rows, respectively, in the image.

At block 130, the borders of a document bounding box may be estimated. The document bounding box may be a rectangular border that may be used to indicate a region in the image to be cropped. The document bounding box may be placed around an area of the document in the image such that, in an example embodiment, the area within the document bounding box may be considered to be included in the document portion of the image.

Estimating a left border of the document bounding box may include examining the histogram frequencies, $h_x$, from left to right. Similarly, estimating a right border of the document bounding box may include examining the histogram frequencies, $h_x$, from right to left. Using $h_x$ and $h_y$ values of the identified image features in one dimension, the location of important and/or salient features in the image may be determined and the borders of the document bounding box may be estimated.

Estimating the left and right borders of the document bounding box may include determining whether the $h_x$ values meet or exceed a predetermined threshold, Count_x. Count_x is an image feature count criteria which is used to evaluate whether a column of pixels achieves a minimum number of pixels containing identified image features as estimated using $h_x$.

Count_x is the image feature count criterion for determining the left and right borders of the document bounding box and may be used as a condition, wherein if a region in the image represented by $h_x$ contains a number of identified image features that is substantially equal or greater than the value of Count_x, then the area may contain salient features and may be bounded by one of the left and right borders of the document bounding box. Count_x may be used to estimate where significant or salient image features are located in the image.

A location of a left edge of the document in the image may be estimated in the area where the count of the identified image features starts to increase above the minimum Count_x while searching the horizontal histogram frequencies from left to right. The first location from the left that reaches the minimum Count_x is presumably the closest portion of the document to the left edge of the image, thus making the location an estimation of the left border of the document bounding box. Further, estimating the left and right borders of the document bounding box may include determining whether the identified borders of the document bounding box are at least a minimum distance from the left and right edges of the image, respectively.

Estimating a top border of the document bounding box may include examining the identified image features in histogram frequencies, hy, from top to bottom. Similarly, examining the image features in histogram frequencies, $h_y$, from bottom to top may be performed to detect the bottom border of the document bounding box. Estimating the top and bottom borders of the document bounding box may include determining whether the hy values meet or exceed a predetermined threshold, Count_y.

Count_y is an image feature count criteria which may be used to evaluate whether a top or a bottom border of the document bounding box achieves a minimum number of pixels containing image features as identified using the gradient values. Count_y may be used to determine where significant or salient image features are located in the image. Count_y is the image feature count criterion for determining the top and bottom borders of the document bounding box and may be used as a condition, wherein if a region in the image represented by histogram frequencies, $h_y$, contains a number of image features that is substantially equal or greater than the value of Count_y, then the area may be bounded by one of the top and bottom borders of the document bounding box.

A location of a top edge of the document in the image may be estimated in the area where the count of the features starts to increase above the minimum Count_y while searching the vertical histogram frequencies from top to bottom. The first location from the top that reaches the minimum Count_y may be the closest to the top edge of the image, thus making the location an estimation of the top border of the document bounding box. Similar to the estimation of the left and right borders of the document bounding box, estimating the top and bottom borders of the document bounding box may include determining whether the identified borders are at least a minimum distance from the top and bottom edges of the image, respectively.

The values of Count_x and Count_y may be determined relative to the dimensions of the input image. In alternative example embodiments, the values of Count_x and Count_y may be determined relative to the dimensions of the scaled image, when the input image has been downscaled prior to processing. For example, small images may have smaller values for the minimum image feature counts Count_x and Count_y compared to larger images.

At block 135, centroids $C_x$ and $C_y$ may be estimated from features in histogram frequencies $h_x$ and $h_y$, respectively, using the following formulas:

$$C_x = \frac{\sum_{i=0}^{width-1} i h_x(i)}{\sum_{i=0}^{width-1} h_x(i)}, \quad C_y = \frac{\sum_{i=0}^{height-1} i h_y(i)}{\sum_{i=0}^{height-1} h_y(i)}$$

Centroids may be the weighted mean of image features in the image using both horizontal and vertical histogram frequencies $h_x$ and $h_y$, respectively. The value calculated using the formulas above may be interpreted as an expected value (e.g. statistical interpretation) when considering the normalized histogram frequencies $h_x$ and $h_y$ as a probability function when the random variable is the location (e.g. x or y) in the image. In an alternative example embodiment, the weighted mean determined above may be centroids (e.g. geometrical interpretation), when the image features at different locations in the image are interpreted as objects of different masses at different locations.

At block 140, measures of dispersion $d_x$ and $d_y$ may be estimated from features in histogram frequencies $h_x$ and $h_y$, respectively, using the following formulas:

$$d_x = \sqrt{\frac{\sum_{i=0}^{width-1}(i-C_x)^2 h_x(i)}{\sum_{i=0}^{width-1} h_x(i)}}, \quad d_y = \sqrt{\frac{\sum_{i=0}^{height-1}(i-C_y)^2 h_y(i)}{\sum_{i=0}^{height-1} h_y(i)}}.$$

The measures of dispersion $d_x$ and $d_y$ show how much dispersion or variation the image features in $h_x$ and $h_y$ have from the average or from the calculated centroids at block 135.

At block 145, the borders of the document bounding box may be determined based on at least one of the centroids $C_x$ and $C_y$, the measures of dispersion $d_x$ and $d_y$, the center of the estimated document bounding box and the initially estimated borders of the document bounding box derived at block 130.

If $|O_x-C_x|>r_x d_x$ and/or $|O_y-C_y|>r_y d_y$, where $(O_x,O_y)$ is the center of the detected bounding box and $r_x$ and $r_y$ are predefined parameters, $h_x$, and $h_y$ are searched for image features starting from the locations of the initially estimated borders of the document bounding box from block 130 until the following conditions are met:

$|O_x-C_x|\le r_x d_x$ and $|O_y-C_y|\le r_y d_y$

Determining the borders of the document bounding box may be performed to refine the borders estimated at block 130. The centroids may be used to refine the initially estimated values that may be affected by one or more factors such as, for example, noisy features (e.g. outliers) in the image. Alternatively, the document bounding box determined at block 130 may be used.

At block 150, the estimated bounding box may be upscaled by a scaling factor. Upscaling the estimated bounding box may be performed if the image was initially downscaled. Upscaling may be a transformation operation applied on the coordinates of the bounding box in the downscaled image to find the corresponding coordinates in the original image to be cropped.

At block 155, the region of the image bounded by the document bounding box with the identified borders may be cropped. In one example embodiment, the region of the image bounded by the document bounding box may be a document captured in an image and identified based on the content of the document. Cropping the image may distinguish an area of a document in the image from a background in the image or from another area that includes a non-document region of the image.

The cropped and/or upscaled image may be stored in a memory in a mobile device. The memory may be, for example, random access memory (RAM), read only memory (ROM), and/or non-volatile RAM (NVRAM). Alternatively, the memory may be in the form of a separate electronic memory (e.g., RAM, ROM, and/or NVRAM), a hard drive, a CD or DVD drive, or any memory device convenient for use with a controller in the mobile device.

Figure 2:
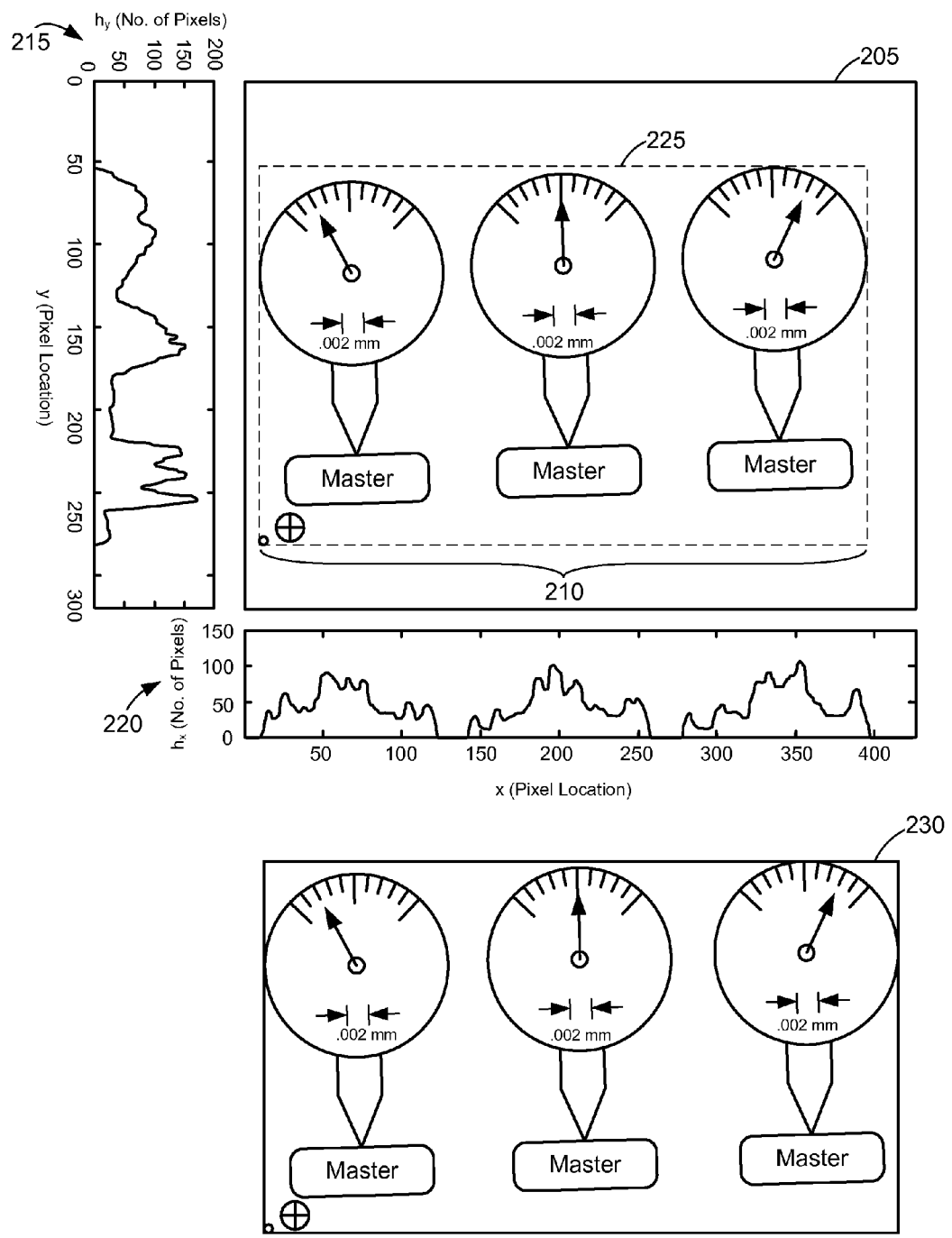
FIG. 2 illustrates an example embodiment of content-driven image cropping using the method of FIG. 1.

FIG. 2 illustrates an example embodiment of content-driven image cropping using the method of FIG. 1. This example embodiment shows an input image 205 having one or more salient features 210 that may be part of a document to be cropped from input image 205.

In this example embodiment, one-dimensional histograms 215 and 220 (vertical and horizontal histograms, respectively) may be constructed to correspond to the identified salient features 210 in the input image 205. A document bounding box 225 may be generated based on the histogram frequencies $h_x$ and $h_y$ to distinguish the salient features 210 in the image 205 from non-document areas. Document bounding box 225 may also be used to crop the region in the image 205 containing the one or more documents (e.g. salient features 210), as shown in cropped image 230.

Vertical histogram 215 shows a generated one-dimensional histogram corresponding to input image 205. Histogram 215 may be constructed by plotting the histogram frequencies $h_y$ in the y-axis and the location of the pixels in input image 205 in the vertical direction in the x-axis. Horizontal histogram 220 may be constructed by plotting the histogram frequencies $h_x$ in the y-axis and the location of the pixels in input image 205 in the horizontal direction in the x-axis. The histogram frequency values plotted in histograms 215, 220 may correspond to the location of significant features in input image 205.

As shown, cropped image 230 shows input image 205 with salient features 210 cropped using the identified document bounding box 225. In an alternative example embodiment, further image processing techniques may be applied to the relatively smaller cropped image 230. Image processing techniques that may be applied include, but are not limited to, document corner detection. The relatively smaller cropped image 230 may provide a much faster and robust application of image processing techniques due to the approximately bounded document.

Figure 3:
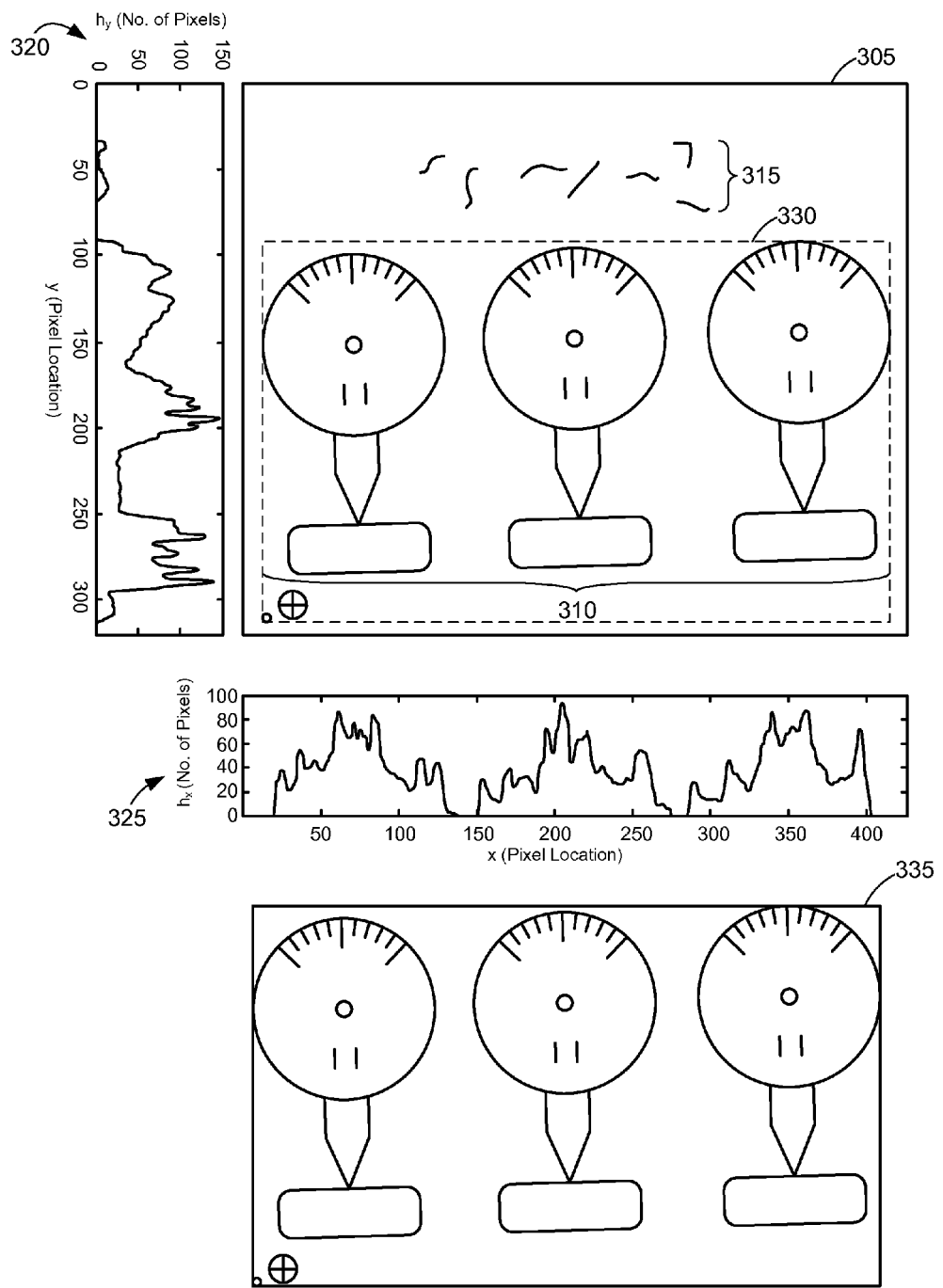
FIG. 3 illustrates another example embodiment of content-driven image cropping using the method of FIG. 1.

FIG. 3 illustrates another example embodiment of content-driven image cropping using the method of FIG. 1. This example embodiment shows an input image 305 having one or more salient features 310 and one or more insignificant image features 315. The salient features 310 may be part of a document to be cropped from input image 305.

In this example embodiment, one-dimensional histograms 320 and 325 (vertical and horizontal histograms, respectively), may be constructed to correspond to the identified salient features 310 in the input image 305. A document bounding box 325 may be generated based on the histogram frequencies $h_x$ and $h_y$ to distinguish the salient features 310 in the image 305 from non-document areas which may include insignificant image features 315. Document bounding box 325 may also be used to crop the region in the image 305 containing the one or more documents (e.g. salient features 310), as shown in cropped image 335.

Vertical histogram 320 shows a generated histogram corresponding to input image 305. Histogram 320 may be constructed by plotting the histogram frequencies $h_y$ in the y-axis and the location of the pixels in input image 305 in the vertical direction in the x-axis. Horizontal histogram 325 may be constructed by plotting the histogram frequencies $h_x$ in the y-axis and the location of the pixels in input image 305 in the horizontal direction in the x-axis. The histogram frequency values plotted in histograms 320, 325 may correspond to the location of significant features in input image 305.

As shown in FIG. 3, cropped image 335 shows input image 305 with salient features 310 cropped using the identified document bounding box 325. In an alternative example embodiment, further image processing techniques may be applied to the relatively smaller cropped image 335. Image processing techniques that may be applied include, but are not limited to, document corner detection. The relatively smaller cropped image 335 may provide a much faster and robust application of image processing techniques due to the approximately bounded document.

It will be appreciated that the actions described and shown in the example flowcharts may be carried out or performed in any suitable order. It will also be appreciated that not all of the actions described in FIG. 1 need to be performed in accordance with the embodiments of the disclosure and/or additional actions may be performed in accordance with other embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of cropping an image based on a content of the image, comprising:
   receiving the image at a processor;
   identifying image features in the content of the image;
   determining horizontal histogram frequencies and vertical histogram frequencies of the identified image features;
   determining borders of a document bounding box based on the determined horizontal histogram frequencies and vertical histogram frequencies;
   determining a horizontal centroid and a vertical centroid of the horizontal and vertical histogram frequencies, respectively;
   resizing the document bounding box based on the determined horizontal and vertical centroids; and
   cropping the image according to the document bounding box as said resized.

2. The method of claim 1, further comprising downscaling the image prior to the cropping the image.

3. The method of claim 2, further comprising upscaling the document bounding box, wherein cropping the image according to the document bounding box includes cropping the image according to the upscaled document bounding box.

4. The method of claim 1, wherein identifying image features in the content of the image includes identifying salient elements in the content of the image as image features and ignoring extraneous elements in the content of the image.

5. The method of claim 1, wherein identifying image features in the content of the image includes determining a gradient of the image and identifying an image feature where a magnitude of the gradient of a portion of the image satisfies a predetermined threshold.

6. The method of claim 1, wherein determining borders of the document bounding box includes:
   determining a left border and a right border of the document bounding box by determining, from left to right of the image and from right to left of the image, respectively, whether a horizontal histogram frequency value exceeds a predetermined threshold; and
   determining a top border and a bottom border of the document bounding box by determining, from top to bottom of the image and from bottom to top of the image, respectively, whether a vertical histogram frequency value exceeds the predetermined threshold.

7. The method of claim 1, wherein determining borders of the document bounding box includes determining whether the borders of the document bounding box are at least a minimum distance from corresponding edges of the image.

8. The method of claim 1, further comprising:
   determining a horizontal dispersion and a vertical dispersion of the horizontal and vertical histogram frequencies, respectively; and
   resizing the document bounding box based on the determined horizontal and vertical dispersions.

9. The method of claim 8, wherein resizing the document bounding box based on the determined horizontal and vertical centroids and the determined horizontal and vertical dispersions includes:
- searching the horizontal histogram frequencies for a condition where an absolute value of a horizontal center of the document bounding box minus the horizontal centroid is no more than the product of a first predefined parameter and the horizontal dispersion; and
- searching the vertical histogram frequencies for a condition where an absolute value of a vertical center of the document bounding box minus the vertical centroid is no more than the product of a second predefined parameter and the vertical dispersion.

10. A method of cropping an image based on image content, comprising:
- receiving the image at a processor;
- identifying image features of the image by determining a gradient of the image;
- determining horizontal and vertical histogram frequencies of the identified image features;
- estimating locations of borders of a document bounding box for cropping the image;
- determining a horizontal centroid and a vertical centroid of the horizontal and vertical histogram frequencies, respectively;
- refining the locations of the borders of the document bounding box based on the determined horizontal and vertical centroids; and
- cropping the image to include the identified image features using the document bounding box and the refined locations of the borders.

11. The method of claim 10, further comprising downscaling the image prior to the cropping the image.

12. The method of claim 11, further comprising upscaling the document bounding box, wherein cropping the image using the document bounding box includes cropping the image using the upscaled document bounding box.

13. The method of claim 10, wherein determining borders of the document bounding box includes examining the horizontal and vertical histogram frequencies of the identified image features.

14. The method of claim 13, wherein examining the horizontal histogram frequencies of the identified image features includes determining a left border and a right border of the document bounding box, wherein the determined left and right borders contain image features having at least a predetermined feature count.

15. The method of claim 14, wherein the left and the right borders have at least a minimum distance from corresponding left and right edges of the image, respectively.

16. A method of cropping an image, comprising:
- receiving the image at a processor;
- downscaling the image;
- identifying image features of the downscaled image by determining a gradient of the image;
- determining horizontal and vertical histogram frequencies of the identified image features;
- examining the horizontal histogram frequencies of the identified image features to determine a left border and a right border of a document bounding box;
- examining the vertical histogram frequencies of the identified image features to determine a top border and a bottom border of the document bounding box;
- determining a horizontal centroid and a vertical centroid of the horizontal and vertical histogram frequencies, respectively;
- refining a location of at least one of the left, right, top and bottom borders of the document bounding box if needed based on the determined horizontal and vertical centroids; and
- cropping the image using the determined borders of the document bounding box.

17. The method of claim 16, further comprising upscaling the document bounding box, wherein cropping the image using the determined borders of the document bounding box includes cropping the image using the upscaled document bounding box.

18. The method of claim 16, wherein the left and the right borders and the top and the bottom borders have at least a minimum distance from corresponding edges of the image.

19. The method of claim 16, wherein the left, right, top and bottom borders contain image features having a predetermined feature count.

* * * * *